July 27, 1965 J. J. PRIMAS 3,197,678

APPARATUS FOR PRODUCING MAGNETIC FIELDS

Filed Jan. 30, 1962 4 Sheets-Sheet 3

July 27, 1965 J. J. PRIMAS 3,197,678

APPARATUS FOR PRODUCING MAGNETIC FIELDS

Filed Jan. 30, 1962 4 Sheets-Sheet 4

United States Patent Office 3,197,678

Patented July 27, 1965

3,197,678

APPARATUS FOR PRODUCING MAGNETIC FIELDS

Johann Jaroslav Primas, Zurich, Switzerland, assignor to Trüb, Taüber & Co. AG., Zurich, Switzerland Filed Jan. 30, 1962, Ser. No. 169,911

Claims priority, application Switzerland, Sept. 26, 1961, 11,222/61

4 Claims. (Cl. 317—158)

The invention relates to a method and to an apparatus for producing magnetic fields having a constant geometrical configuration with different field strengths. The invention also relates to a method and apparatus for producing homogenous magnetic fields for various field strengths. The invention relates further to a method for preventing saturation phenomena in magnetic pole shoes with higher field strengths. Furthermore, the invention relates to a method and apparatus for maintaining constant the shape of the stray field across the air gap of a magnet with various field strengths. Finally, the invention relates to a method and apparatus for maintaining constant the magnetic resistance of the air gap of a magnetic circuit with different circulations.

Figure 1A:
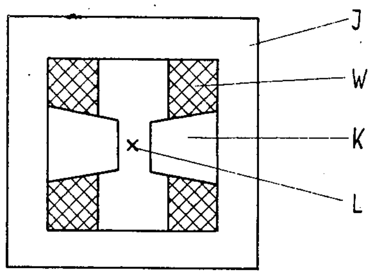
Figure 1B:
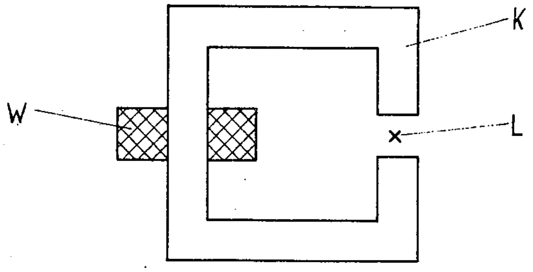
Figure 1C:
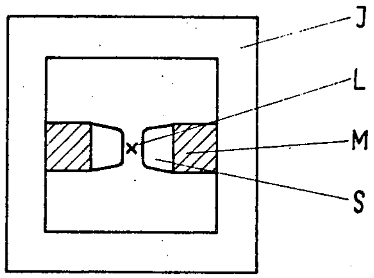
Figure 2A:
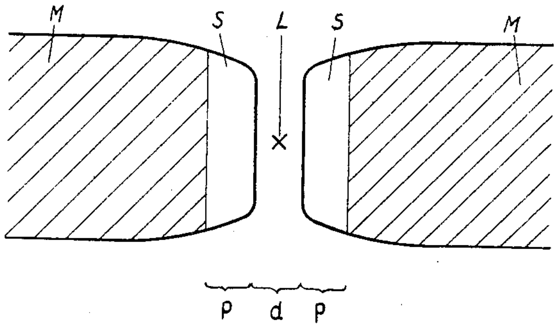
Figure 2B:
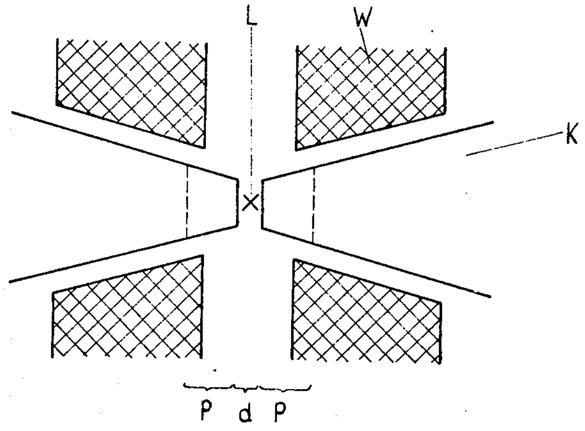
Figure 2C:
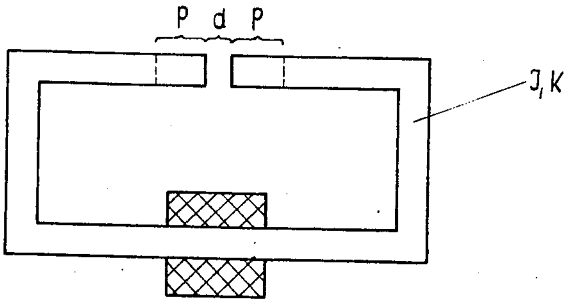

The state of the art will be further explained with reference to the accompanying drawing, in which:

Sheet 1 shows three types of magnetic circuits, viz.,

FIG. 1*a* is a cross-section of an electromagnet with yoke, core, winding and air gap;

FIG. 1*b* is a cross-section of a stray choke with core, winding and air gap;

FIG. 1*c* is a cross-section of a permanent magnet with yoke, permanent magnetic core, soft pole shoes and air gap;

Sheet 2 illustrates the definition of the term pole shoe used in this description:

FIG. 2*a* is a cross-section of the pole shoes of a permanent magnet with intermediate air gap L having the width *d*, in which the pole shoes consist of conventional pole shoes and a part of the permanent magnetic core;

FIG. 2*b* is a cross-section through the pole shoes of an electromagnet with winding and air gap where the pole shoes form part of the core;

FIG. 2*c* is a cross-section of the pole shoes of a choke, which form part of a yoke or core.

Figure 3A:
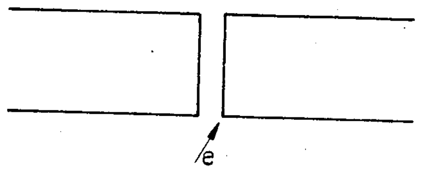
Figure 3B:
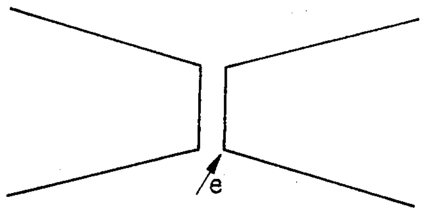
Figure 3C:
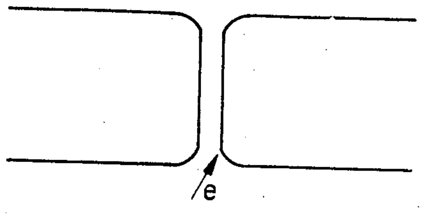
Figure 3D:
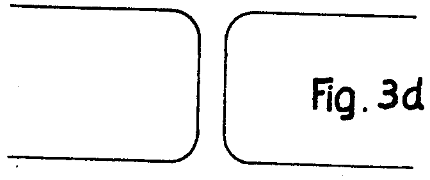
Figure 4A:
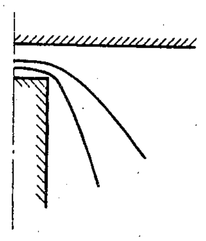
Figure 4B:
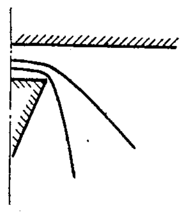
Figure 4C:
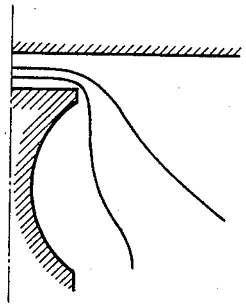
Figure 4D:
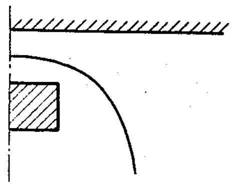
Figure 4E:
Figure 4F:
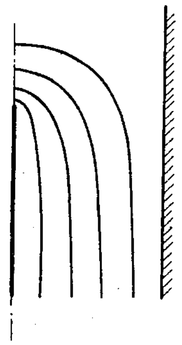
Figure 4G:
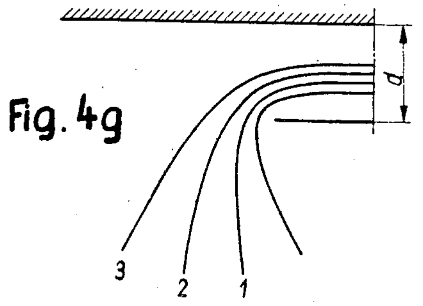

Sheet 3 shows four different kinds of pole shoes: viz.,

FIG. 3*a* is a partial elevation view of one type of pole shoe;

FIG. 3*b* is a partial elevation view of another type of pole shoe;

FIG. 3*c* is a partial elevation view of another type of pole shoe;

FIG. 3*d* is a partial elevation view of another type of pole shoe;

Sheet 4 shows seven examples of pole shoes and the configurations of the fields thereof, viz., FIG. 4*a* is a partial cross-section of a pole shoe and its rotationally symmetrical field;

FIG. 4*b* is a partial cross-section of another pole shoe and its rotationally symmetrical field;

FIG. 4*c* is a partial cross-section of another pole shoe and its rotationally symmetrical field;

FIG. 4*d* is a partial cross-section of another pole shoe and its rotationally symmetrical field;

FIG. 4*e* is a partial cross-section of another pole shoe and its rotationally symmetrical field;

FIG. 4*f* is a partial cross-section of another pole shoe and its rotationally symmetrical field;

FIG. 4*g* is a partial cross-section of a pole shoe having a large air gap and its rotationally symmetrical homogeneous field.

The invention relates to magnetic circuits, such as electromagnets (FIG. 1*a*) or stray chokes (FIG. 1*b*), consisting of a winding W, a core K and an air gap L. The invention also relates to permanent magnets (FIG. 1*c*) with an air gap L, and especially to the geometrical shape of the pole shoes of such magnets. In permanent magnets, the pole shoe P (FIG. 2*a*) is usually the soft ferromagnetic part S fitted to the core M of permanently magnetized material. In the present description, the term pole shoe P applies to that part of the magnet which is located adjacent to the air gap, up to a depth of twice the width *d* of the air gap L (FIG. 2*a*), irrespective of whether or not this definition comprises only a portion of the conventional term "pole shoe". However, where the conventional pole shoe is thinner than two times the width *d*, the term pole shoe applies only to the conventional pole shoe (FIG. 2*a*). Also with electromagnets (FIG. 2*b* and 2*c*), the portion from the air gap to the depth 2*d* will be referred to as pole shoe, without regard to whether or not it is conventionally referred to as core K or yoke J, whether or not it is offset relative to the remainder, and whether or not the winding W partially surrounds it.

It is known that the magnetic field leaves the surface of these pole shoe practially perpendicularly when the field strengths are so low that no magnetic saturation occurs in the pole shoes. Under these conditions, the surface of the pole shoe represents an equipontential surface of the magnetic field in the air gap and its surroundings. It determines thereby the geometrical shape of the field, that is to say, the position of the field lines and of the equipotential surfaces. A change in the excitation of the magnet changes the field strengths and potentials of the field in the gap and its surroundings, but the geometrical configuration of the field is maintained.

However, according to past experience, this state exists only so long as the field strength in the air gap does not exceed at any point about 15,000 gauss. This value may be slightly higher or lower according to the nature of the magnet, but does not exceed with known magnets at any time 16,000 gauss, while it may often be only 12,000 to 13,000 gauss. When the field strength exceeds this critical value, the geometrical shape of the magnetic field will change with the excitation quickly and considerably. This distortion is the effect of the magnetic saturation within the pole shoe: the magnetic permeability of the material quickly drops in the saturated regions, the field no longer leaves the pole shoe perpendicularly, and the pole shoe surface remains no longer the potential surface. This property of field distortion with higher fields is often undesirable in engineering. Many applications require a field the geometry of which is fixed while the field strength varies within wide limits, such as, for example, arrangements for focussing a beam of charged particles, such as focussing lenses for corpuscular beams, magnets for impulse spectroscopy to measure the momentum of charged particles; arrangements adapted to supply a homogeneous field with field strength variable within wide limits, such as magnets for nuclear magnetic resonance or electron paramagnetic resonance tests, deflection magnets, Zeeman magnets; arrangements for producing a magnetic reluctance constant within wide limits, such as high leakage inductances and stray transformers. In all these applications, the desired range of the field strength variation often exceeds 15,000 gauss, and the extension of the range of constant field configuration beyond this limit has been the object of much research.

A number of investigations in this direction accept the fact of the local saturation at 15,000 gauss as immutable law, and aim at compensating the field distortion occurring above 15,000 gauss by means of separately supplied additional magnets, additional coils and correspondingly complicated controls, in order to maintain the field geometry constant (see, e.g., U.S.A. Patent No. 2,964,627Q.

A paper has been published, attempting to eliminate the pre-cited effect of the saturation in the pole shoes (Hiroo Kumagi, Nuclear Instruments and Methods, 6 (1960), pp. 213–216). This paper starts with the consideration that the saturation in the pole shoe occurs first at single local points, where the field strength assumes higher values than the average for the pole shoe; that the limit of the field distortion in the air gap may be raised substantially beyond 15,000 gauss if the field is homogenously distributed in the pole shoe, that is, if the same field strength prevails at all points in the pole shoe. Since the local fields within the pole shoe cannot be measured by simple methods, the postulate of equal field strength in all parts is equalized to the postulate of equal total induction in each cross-section of the pole shoe. This induction is measured, and a pole shoe is calculated and constructed which meets these requirements. Although this result yields a reduction in the field distortion with rising field strength, compared with hitherto known pole shoes, the aim of a constant geometry is not reached. It is obvious that either the theoretical conditions or the experimental execution in this paper are insufficient.

It is the object of the invention to indicate a shape for the surface of a pole shoe so that the field in the air gap and its environment maintains its geometrical shape up to a value over 16,000 gauss, and that, therefore, the magnetic resistance remains constant within a wide range also at field strengths above 16,000 gauss. This object is realized in that the surface of the pole shoe is so designed that, with a field strength in the air gap of 16,000 gauss a magnetic saturation of the surface is not reached at any point of the pole shoe. To this end it is necessary that no point of the surface of the pole shoe has a radius of curvature which is smaller than half the width of the air gap.

It took years of experiments to comprehend accurately the effects of the geometrical shape of the pole shoe on the saturation behavior. It was discovered that the knowledge of the field behavior on the surface of the pole shoes may solve the problem without knowing in detail the field distribution within the interior of the pole shoe. This is of great advantage because the local field distribution on the surface may be measured by means of known methods, while this may present grave difficulties for the local field distribution in the interior.

The fact that the local field distribution on the surface is decisive for the behavior of the field in the air gap, is very surprising, and equally unexpected results became apparent during the tests.

These results will be further explained with reference to FIG. 3 of the drawing.

FIG. 3*a* shows the simplest form of pole shoes, viz., rotationally symmetrical cylinders. It has been known for a long time that the edges *e* of this type of pole shoe tend to be saturated very early so that this form has very unfavorable properties from the point of view of the present problem. The types shown in FIGS. 3*b* and 3*c* are known improvements; in some way or other, all known pole shoes for magnets with field strengths variable within wide limits have been derived from this form, This known type of pole shoe is characterized by the presence of a discontinuity in the slope of the tangent to the surface; i.e., by the always present flat surface across the gap which passes through a corner *e* directly or in a rounded-off manner into a cone or a cylinder.

However, all these forms with an edge *e* of any shape do not extend the range without field distortion beyond 15,000 gauss. At an edge with small or infinitely small radius of curvature, saturation occurs very quickly and the field is distorted. This is known and the general conception is that, due to the saturation of the corner, this corner is automatically eliminated since in view of the declining permeability the corner can no longer be regarded as magnetic material, but may slowly be regarded as becoming like the surrounding air. The investigation yielded the entire novel knowledge that the effect of this corner is entirely unexpected; that it changes the entire field distribution within the pole shoe, thereby causing an unexpectedly great effect, that is to say, that this corner is substantially responsible for the field distortion occurring with higher fields. If the corner is rounded off in such a manner that the radius of curvature does not exceed at any point half the pole shoe gap, field distortion does not occur until the field strengths are higher by several thousand gauss. These geometrical differences between a pole shoe according to FIG. 3*c* and a pole shoe according to the invention, as shown in FIG. 3*d* may amount under certain conditions only to a few tenths of a millimeter, as has been found experimentally with a magnet with 30 mm. air gap.

The elimination of the local saturation in this corner by rounding the same off as described herein results in quite considerable advantages even with very small geometrical differences.

The method disclosed hereinbefore, aiming at preventing local saturations at the surface of the pole shoe at 16,000 gauss in the air gap, is only a first step. Investigations have shown that this method may be extended to much higher fields, for example up to 22,000 or 25,000 gauss. However, in this case the stipulation that smaller radii of curvature than the width of the gap must be avoided is no longer sufficient, and great care must be taken to prevent any saturation in the entire surface of the pole shoe.

Such an improved method might also be found by measuring the local fields on the surface of the pole shoe. However, it must be noted that any small change in the geometrical shape at any one point changes the entire course of the field in the pole shoe so that this procedure does not always lead to convergent results. Taking into consideration that changes in the surface configuration by a few tenths of a millimeter may result in considerable changes in the field and that the investigations and changes in the surface configuration of large magnets are very laborious and time-wasting, it is obvious that this procedure will not be successful in the majority of cases. This also appears to be the reason that today there are still generally used pole shoes which must be regarded as very unsatisfactory from the point of view of the present invention.

The result of the investigations, according to which the elimination of local saturation on the surface of the pole shoe is sufficient to prevent the distortion of the field, must therefore be regarded as substantial progress. This result has also led to a method whereby pole shoes may be so constructed a priori that no saturation occurs at any point of the surface, before this saturation occurs at a wanted point.

Starting with the fact that each shape of pole shoe represents with small fields an equipotential surface of the magnetic field, the problem may be solved by ensuring that the surface of the pole shoe remains the equipotential surface also with higher fields. This is the case where, with low excitation, the highest field strength occurs in the surface of the pole shoe where the highest field prevails in the air gap; i.e., the highest local field strength in the surface of the pole shoe and the highest local field strength in the plane equidistant from both pole shoes occur at the same distance (normally zero) from the central axis of the pole shoes. If this condition is fulfilled, saturation will first occur at this point when the excitation is increased. If, for example, in a magnet according to FIG. 3*d*, the maximum field lies in the central axis of the pole shoes, and the field decreases in the surface of the pole shoes with low excitation continuously towards the outside and rear, with increased excitation saturation will first occur in the center of the surface of the pole shoes. However, there, the surface curvature is zero and the material may be used to the limit of its saturability.

From this, there results the following procedure for the construction of pole shoes according to the invention.

A shape of pole shoe is assumed which produces the desired shape of field. Along this surface, the field is calculated while the saturation is neglected, that is to say, with low excitation. If this field remains constant or drops continuously from its highest point, the object is realized.

However, in this general form, the problem cannot be calculated. For this reason, the following method is specified for the practical execution:

In putting the invention into practice an electrostatic analogon of the magnetic apparatus is designed having an electrode arrangement which produces a field with the desired geometrical shape. From this arrangement, successively different potential surfaces are calculated. Then the field distribution along these potential surfaces is calculated. All potential surfaces, along which the field strength remains constant or declines uniformly from the greatest value, are suitable configurations for pole shoes, in which the field will maintain its shape also with higher fields in the air gap than 16,000 gauss. The most advantageous shape, in which the field geometry remains constant longest, is that potential surface along which in the vicinity of the point of the highest field there occurs the lowest drop of the field towards the outside, that is, the first potential surface immediately adjacent to those surfaces along which there is a local increase of the field towards the outside.

This method may be carried out by means of modern computers. If the electrostatic analogon is translated into experimental magnetostatics, due to the properties of the magnetic material, the potential surfaces will no longer be exactly equipotential surfaces, but this deviation in the exit angle of the field lines out of the pole shoe will not exceed 1–2° from a right angle so that the pole shoe surfaces may be regarded as equipotential surfaces within the experimental accuracy.

Thus, the method for constructing the shapes of pole shoes of a magnetic circuit for producing a magnetic field in the air gap between these pole shoes and in the surroundings comprises the construction of an electrostatic system, the field distribution of which is similar to that of the magnetostatic field to be produced; the calculation of the potential surfaces of this system; calculating the pattern of the field along these potential surfaces; and selecting one of those potential surfaces as the shape for the pole shoe, along which surface the field remains constant and declines from its maximum value in all directions.

The calculations are obviously simpler if the desired field is rotationally symmetrical, since in this case a two-dimensional calculation is possible in good approximation, provided that the diameter of the pole shoe is much larger than the pole shoe gap.

If the configuration of the field remains constant up to high field strengths, also the leakage field and the magnetic reluctance of the air gap remain constant.

Some rotationally symmetrical examples are shown in FIG. 4*a* to 4*g*. Electrode shapes have been assumed which are to produce certain field patterns. Of the plotted equipotential lines in FIGURES 4*a* to 4*f*, the innermost curve with the smallest radius of curvature is near the optimum shape of a pole shoe; all curves outside this optimum curve are possible forms of pole shoes according to the invention, but the height of the possible field strength without distortion of the field decreases with the distance from the optimum curve.

FIG. 4*g* shows a special application. Desired is a rotationally symmetrical homogeneous field between two pole shoes, between which there is an air gap with the width *d*, and which have a diameter of 5*d* to 6*d*. A two-dimensional calculation is possible. The electrostatic analogon is the plate condenser. In order to locate the desired equipotential lines within the range of the desired pole shoe gap, the plate gap of the condenser must be selected larger than the pole shoe gap. Calculations have shown that the optimum plate gap is 2*d*. For the purpose of simplification, a single plate is selected, facing a plate with infinite dimensions at a distance *d*. This gives the same field configuration as with the plate condenser with the gap 2*d*. Potential lines of this field are plotted in FIG. 4*g*. Calculation shows that with all potential lines which are bent back towards the bottom, as line 1, the field along the bend is higher than in the centre of the plate condenser. According to the invention, these potential lines are therefore unsuitable. The lines with the shapes 2 and 3, however, are suitable for the construction of pole shoes. The optimum pole shoe is produced by means of line 2 which intersects the axis of rotation at the distance $d/2$ from the plate and approaches asymptotically the perpendicular to the plane of the plate. Along this line, the field remains constant longest and then decreases uniformly. The air gap between the pole shoes constructed along this line has exactly the width *d*.

Measurements with a magnet with pole shoes of this kind have shown that, with an air gap of 30 mm., the field in the air gap remains constant up to 22,000 gauss. This form of pole shoe differs only by a few tenths of a millimeter from that specified by Kumagi in the pre-cited paper. However, the effect is that the onset of the distortion of the field is shifted from 12,000 gauss to 22,000 gauss. The pole shoe according to the invention is that aimed at by Kumagi, because here the field lines run parallel within the pole shoe and in the air gap.

With decreasing pole shoe diameter and with the same pole shoe gap, the two-dimensional approximation becomes less accurate, but is in most cases sufficient. A three-dimensional calculation takes more time, but may be effected.

Whilst deviations of tenths of a millimeter or of 1% of the air gap at the points of strong curvature cause strong distortion of the field, at points of small curvature such a deviation may be tolerated without the risk of strong field distortion.

The postulate of a decreasing or constant field along the equipotential line surrounding the pole shoe leads generally to a maximum permissible radius of curvature of somewhat more than half the pole shoe gap.

What I claim is:

1. Apparatus for producing a magnetostatic field of predetermined form comprising two pole shoes on a common yoke and separated by an air gap, each pole shoe having a surface form corresponding to a potential surface of an electrostatic field whose field distribution in the air gap and its vicinity is the same as that of the desired magnetostatic field, the electrostatic field strength on the said potential surface having a constant value at the point of greatest field strength and a declining value in all directions from the single point of greatest field strength, and each pole shoe surface having a radius of curvature greater than half the width of said air gap.

2. Apparatus as claimed in claim 1, in which the shoe is rotationally symmetrical.

3. Apparatus as claimed in claim 2 in which the pole shoe surface deviates from the said potential surface, at points of low radius curvature of the pole shoe surface, by up to 1% of the separation of the pole shoes.

4. Apparatus as claimed in claim 2 in which the pole shoe surface is identical with the said potential surface at points of large radius curvature.

References Cited by the Examiner

UNITED STATES PATENTS

| | | | |
|---|---|---|---|
| 2,719,924 | 10/55 | Oppenheimer et al. | 250—41.9 |
| 2,777,958 | 1/57 | Poole | 317—200 |
| 3,056,070 | 9/62 | Nelson | 317—158 |

LARAMIE E. ASKIN, *Primary Examiner.*

JOHN F. BURNS, *Examiner.*